(12) United States Patent  
Furman et al.

(10) Patent No.: US 8,292,352 B2  
(45) Date of Patent: Oct. 23, 2012

(54) UTILITY VEHICLE

(75) Inventors: Tyler Furman, Raymond, NE (US); Hidetoshi Kaku, Lincoln, NE (US)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 171 days.

(21) Appl. No.: 12/980,254

(22) Filed: Dec. 28, 2010

(65) Prior Publication Data

US 2012/0161477 A1    Jun. 28, 2012

(51) Int. Cl.
*B60N 99/00* (2006.01)
(52) U.S. Cl. .................. 296/190.03; 280/748
(58) Field of Classification Search ............. 296/190.03, 296/146.1, 147, 148, 152; 49/381, 363, 465; 160/92, 95, 327, DIG. 2, DIG. 8; 180/271; 280/748, 749
See application file for complete search history.

(56) References Cited

U.S. PATENT DOCUMENTS

| | | | | |
|---|---|---|---|---|
| 5,135,080 A * | 8/1992 | Haston | | 187/222 |
| 5,393,118 A * | 2/1995 | Welborn | | 296/147 |
| 5,707,075 A * | 1/1998 | Kraft et al. | | 280/730.2 |
| 5,713,624 A * | 2/1998 | Tower | | 296/152 |
| 7,097,237 B2 * | 8/2006 | Weiner et al. | | 296/190.11 |
| 7,125,069 B2 * | 10/2006 | Cacucci et al. | | 296/190.03 |
| 7,556,291 B2 * | 7/2009 | Gale et al. | | 280/749 |
| 7,735,863 B2 * | 6/2010 | Walston et al. | | 280/749 |
| 7,740,276 B2 * | 6/2010 | Watson | | 280/748 |
| 2001/0017462 A1 * | 8/2001 | Abels et al. | | 280/748 |
| 2001/0033084 A1 * | 10/2001 | Murray et al. | | 296/24.1 |
| 2004/0212217 A1 * | 10/2004 | Cacucci et al. | | 296/152 |
| 2007/0018442 A1 * | 1/2007 | Kwok | | 280/749 |
| 2009/0243339 A1 | 10/2009 | Orr et al. | | |
| 2011/0156438 A1 * | 6/2011 | Ichihara et al. | | 296/181.1 |

* cited by examiner

*Primary Examiner* — Lori Lyjak
(74) *Attorney, Agent, or Firm* — Alleman Hall McCoy Russell & Tuttle LLP

(57) ABSTRACT

A utility vehicle includes a seat mounted to a vehicle body frame to seat a passenger thereon; a side member positioned outward in a vehicle width direction relative to the seat and forming a part of the vehicle body frame; an access opening defined by the side member, the seat being accessible by the passenger through the access opening; a door rotatably mounted to the side member to open and close a part of the access opening; and a protective cover provided between the door and the side member and coupled to the door and to the side member; the protective cover being rotatable with respect to the side member along with the door and closing at least a part of a portion of the access opening, which portion is above the door, in a state where the door is closed.

12 Claims, 8 Drawing Sheets

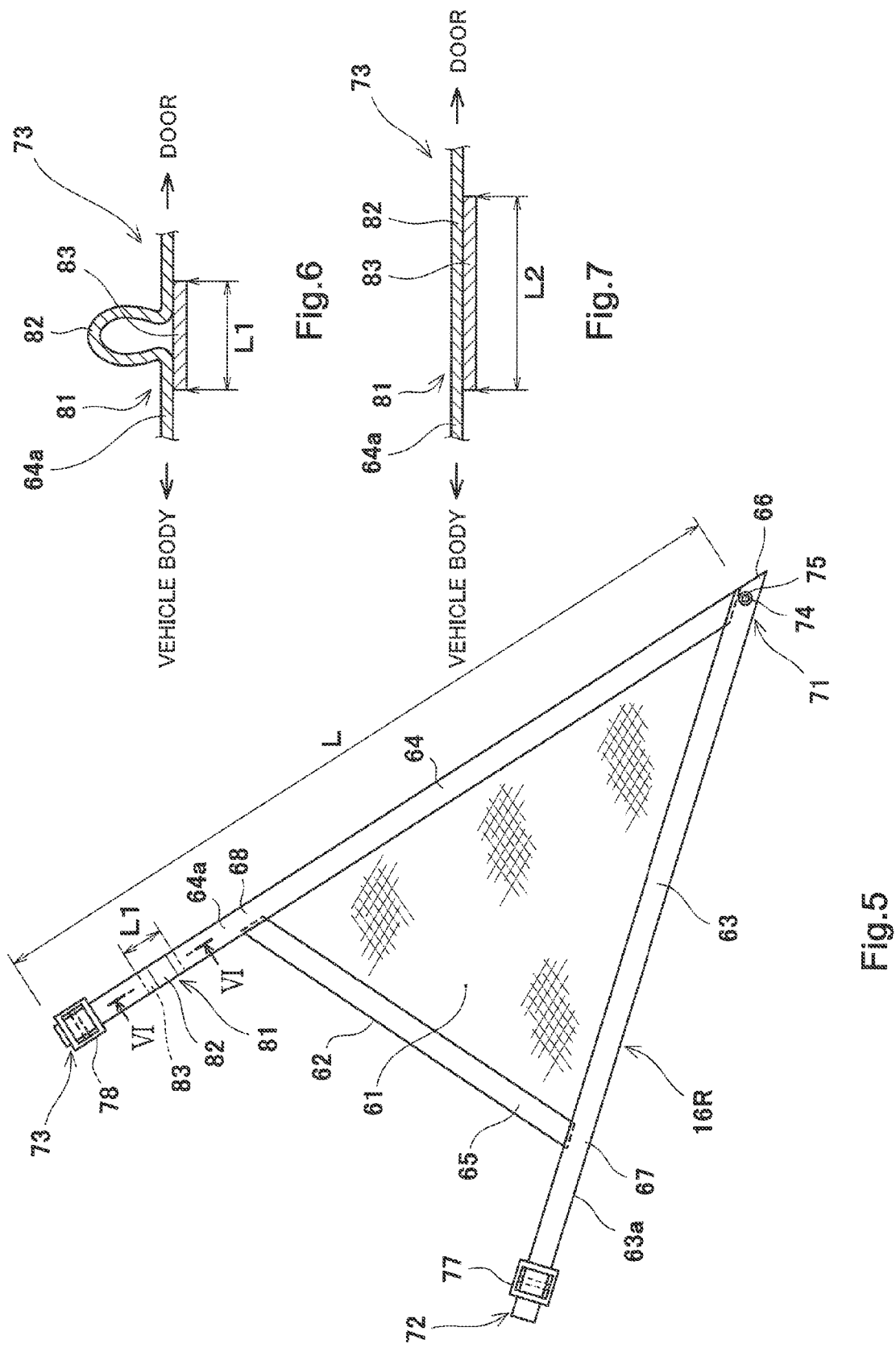

UTILITY VEHICLE

BACKGROUND OF THE INVENTION

1. Field of the Invention

The present invention relates to a utility vehicle including seats on which passengers are seated.

2. Description of the Related Art

U.S. Patent Application Publication No. 2009/0243339 discloses a utility vehicle including a roll cage defining a protected region near a seat. The roll cage defines an access opening in a location lateral relative to the protected region. A passenger can get into the protected region through the access opening. The utility vehicle disclosed in the above reference has a net structure covering the access opening.

However, the net structure is attached to the roll cage. Therefore, the passenger has to carry out a burdensome operation of detaching the net structure from the roll cage or reattaching the net structure to the roll cage, to open or close the access opening, when getting into or getting out of the utility vehicle.

SUMMARY OF THE INVENTION

A utility vehicle of the present invention comprises a seat mounted to a vehicle body frame to seat a passenger thereon; a side member positioned outward in a vehicle width direction relative to the seat and forming a part of the vehicle body frame; an access opening defined by the side member, the seat being accessible by the passenger through the access opening; a door rotatably mounted to the side member to open and close a part of the access opening; and a protective cover provided between the door and the side member and coupled to the door and to the side member; the protective cover being rotatable with respect to the side member along with the door and closing at least a part of a portion of the access opening, which portion is above the door, in a state where the door is closed.

In the above configuration, when the door rotates, the protective cover rotates along with the door and opens or closes the access opening. Therefore, the passenger does not have to perform a burdensome operation to open or close the access opening, when getting into or out of the vehicle.

The above and further objects and features of the invention will more fully be apparent from the following detailed description with reference to accompanying drawings.

BRIEF DESCRIPTION OF THE DRAWINGS

FIG. 5 is a side view showing a protective cover provided to correspond to a front door when viewed from a left side.

FIG. 6 is a partial cross-sectional view of the protective cover taken along line VI-VI of FIG. 5, showing a state where an extendable and contractible portion of the protective cover is contracted.

FIG. 7 is a cross-sectional view showing a state where the extendable and contractible portion is extended.

DETAILED DESCRIPTION OF THE PREFERRED EMBODIMENTS

Hereinafter, embodiments of the present invention will be described with reference to the drawings. The stated directions are referenced from the perspective of a driver straddling the utility vehicle.

(Embodiment 1)

Figure 1:
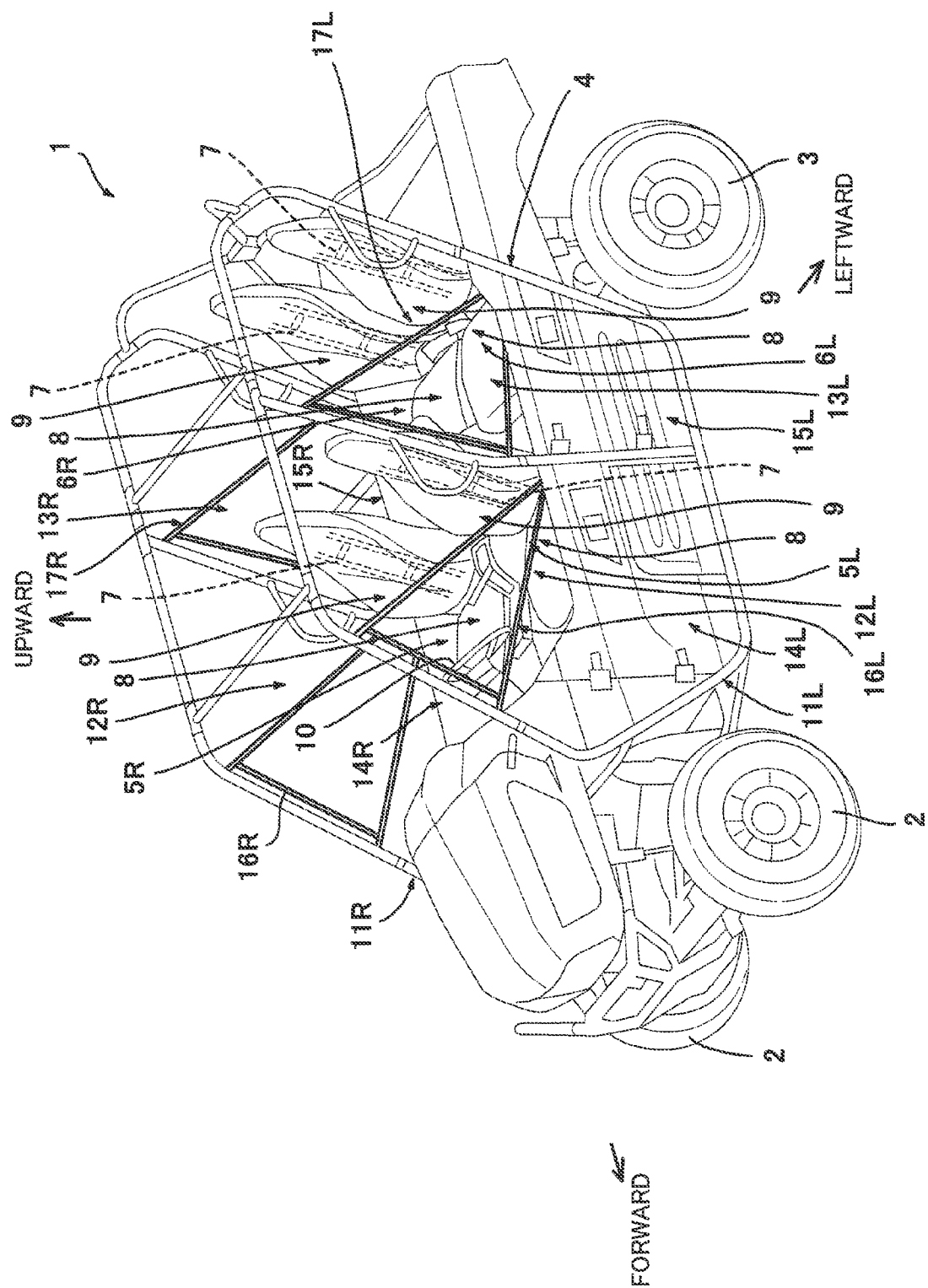
FIG. 1 is a perspective view showing an external appearance of a utility vehicle according to Embodiment 1 of the present invention.

FIG. 1 is a perspective view showing an external appearance of a utility vehicle 1 according to Embodiment 1 of the present invention. As shown in FIG. 1, the utility vehicle 1 includes right and left front wheels 2, right and left rear wheels 3, a vehicle body frame 4 from which the four wheels 2 and 3 are suspended, and four seats 5L, 5R, 6L and 6R mounted to the vehicle body frame 4. Each of the four seats 5L, 5R, 6L and 6R includes a seat frame 7 (see FIG. 2) attached to the vehicle body frame 4, a seat bottom 8 mounted to the seat frame 7, and a seat backrest 9 mounted to the seat frame 7. A passenger can be seated on the seat bottom 8 and can be supported by the seat backrest 9. Among the four seats, two front seats 5L and 5R are arranged side by side in a rightward and leftward direction, while two rear seats 6L and 6R are arranged side by side in the rightward and leftward direction. The left front seat 5L is a driver seat and a steering wheel 10 is disposed in front of the driver seat.

The vehicle body frame 4 includes a left side member 11L and a right side member 11R. The left side member 11L is positioned outward (leftward) in a vehicle width direction relative to the left front seat 5L and the left rear seat 6L. The left side member 11L defines a left front access opening 12L and a left rear access opening 13L through which the passenger can access the left front seat 5L and the left rear seat 6L, respectively. The right side member 11R is positioned outward (rightward) in the vehicle width direction relative to the right front seat 5R and the right rear seat 6R. The right side member 11R defines a right front access opening 12R and a right rear access opening 13R through which the passenger can access the right front seat 5R and the right rear seat 6R, respectively. The passenger can get into the vehicle through any one of the access openings, from outside, can be seated on the seat bottom 8 of the corresponding seat, and can be supported by the seat backrest 9 of the corresponding seat. The passenger can get out the vehicle, through any one of the access openings 12L, 12R, 13L, and 13R, from inside the vehicle.

The utility vehicle 1 includes a left front door 14L, a right front door 14R, a left rear door 15L and a right rear door 15R. The left front door 14L is rotatably mounted to the left side member 11L so as to open and close a part of the left front access opening 13L. A left front protective cover 16L is provided between the left front door 14L and the left side member 11L and coupled to them. The left front protective cover 16L is disposed to close a part of a portion of the left front access opening 12L, which portion is above a portion closed by the left front door 14L, and is rotatable along with the left front door 14L. The doors 14R, 15L and 15R are provided with protective covers 16R, 17L and 17R, respectively.

Figure 2:
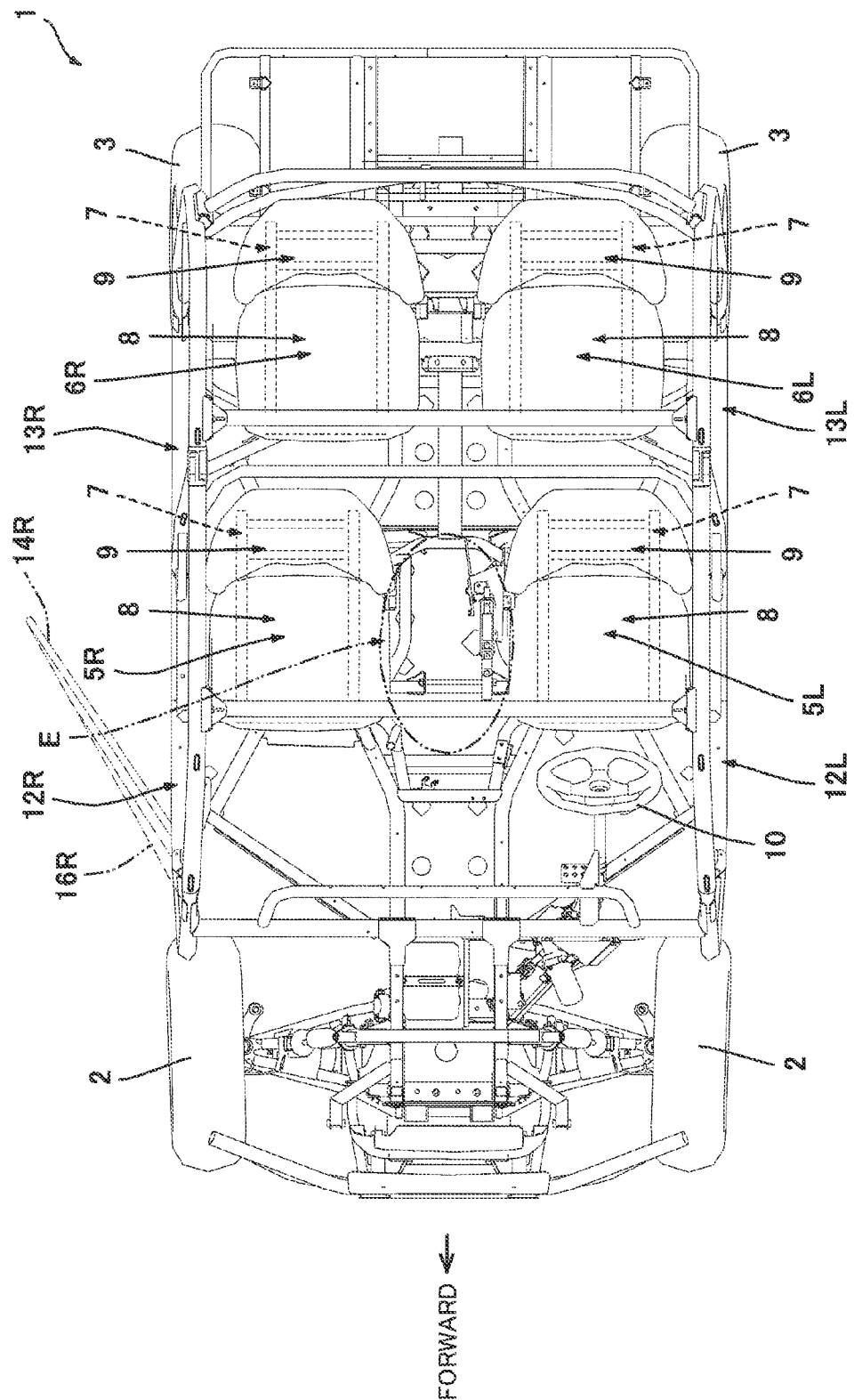
FIG. 2 is a plan view of the utility vehicle.

FIG. 2 is a plan view of the utility vehicle 1, showing a state where the right front door 14R is open as viewed from above. As shown in FIG. 2, when the passenger gets into the vehicle through the access opening, from outside, the passenger has only to perform an operation for opening the door to open the portion of the access opening which is closed by the door and open the portion of the access opening which is closed by the protective cover. Thus, the passenger can open the access opening wide without a burdensome operation and get into the vehicle easily. The passenger in the vehicle has only to perform an operation for closing the door to close the portion of the access opening which is to be closed by the door and close the portion of the access opening which is to be closed by the protective cover. Thus, the passenger can close the access opening without performing a burdensome operation and start the vehicle easily. During driving, the access opening is closed by the door and the protective cover to suppress the passenger from moving outward in the vehicle width direction. Similar to an action made when getting into the vehicle, the passenger can get out of the vehicle and go away from the vehicle without a burdensome operation although the protective cover is used to close the access opening.

Figure 3:
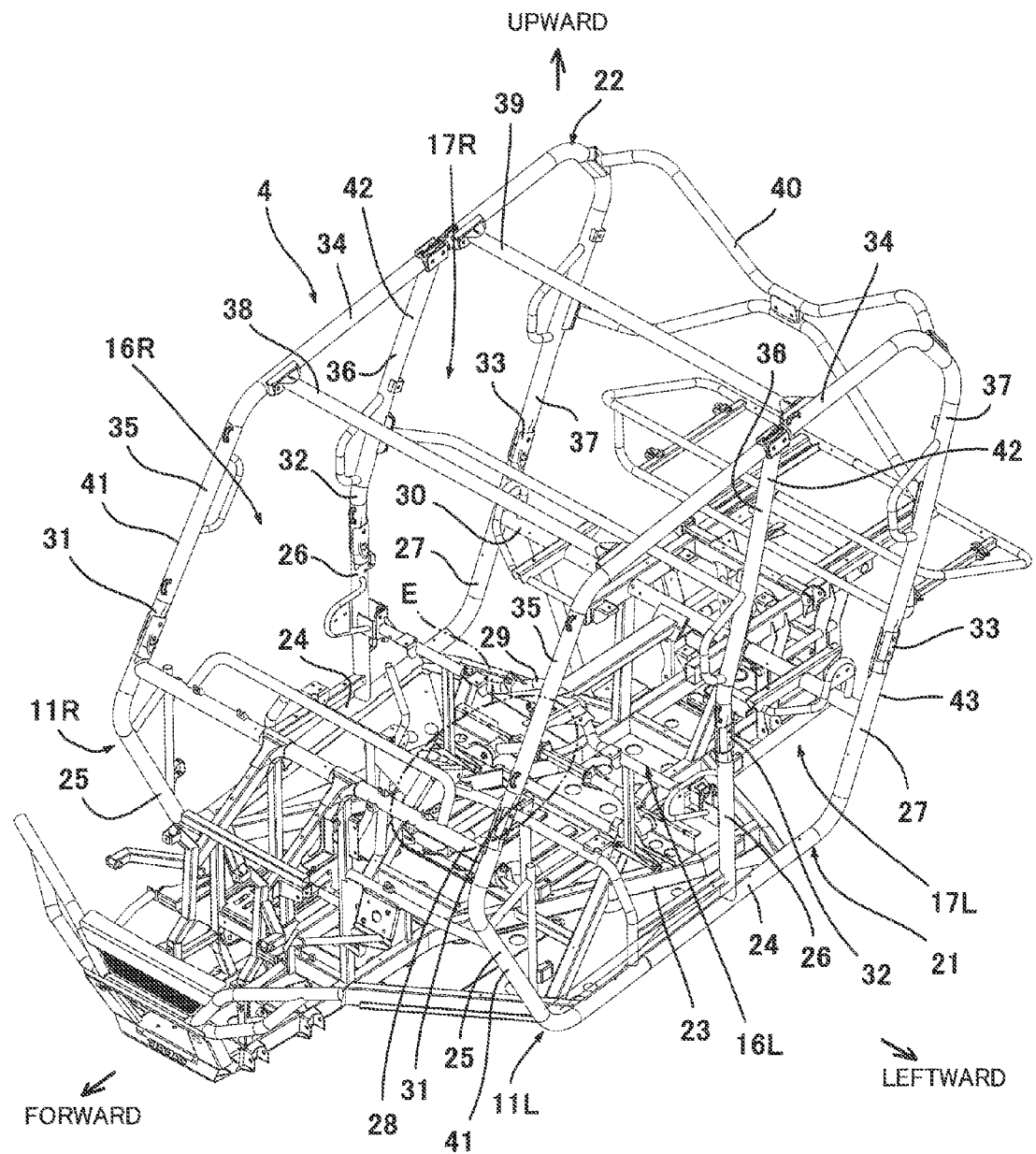
FIG. 3 is a perspective view showing a configuration of a vehicle body.

Hereinafter, the side member, the access opening, the door and the protective cover will be described in detail. FIG. 3 is a perspective view showing a configuration of the vehicle body frame 4. As shown in FIG. 3, the vehicle body frame 4 includes a main frame 21 and a cabin frame (ROPS) 22. The main frame 21 includes a floor member 23, right and left lower side pipe elements 24, right and left first lower pillar pipe elements 25, right and left second lower pillar pipe elements 26, and right and left third lower pillar pipe elements 27. The floor member 23 is constructed of a plurality of square pipes extending substantially horizontally which are welded to each other, and faces a road surface. The front wheels 2 (see FIG. 1) are suspended from a front portion of the floor member 23. An engine E is mounted to a center portion of the floor member 23 in a forward and rearward direction. The rear wheels 3 (see FIG. 1) are suspended from a rear portion of the floor member 23.

The right and left lower side pipe elements 24 extend in the forward and rearward direction, outside of the floor member 23 in the vehicle width direction. The right and left first lower pillar pipe elements 25 extend upward from front end portions of the lower side pipe elements 24, respectively. The right and left second lower pillar pipe elements 26 extend upward from center portions of the lower side pipe elements 24 in the forward and rearward direction, respectively. The right and left third lower pillar pipe elements 27 extend upward from rear end portions of the lower side pipe elements 24, respectively. The pipe elements 25 to 27 are round pipes having circular cross-sections, respectively. The lower side pipe elements 24 are welded to the floor member 23.

The first lower pillar pipe elements 25 are coupled to each other by a cross member 28 extending in a rightward and leftward direction. The second lower pillar pipe elements 26 are coupled to each other by a cross member 29 extending in the rightward and leftward direction. The third lower pillar pipe elements 27 are coupled to each other by a cross member 30 extending in the rightward and leftward direction. Coupling portions 31 to 33 are provided at upper end portions of the lower pillar pipe elements 25 to 27, to couple the lower pillar pipe elements 25 to 27 to the cabin frame (ROPS) 22.

The cabin frame (ROPS) 22 includes right and left upper side pipe elements 34, right and left first upper pillar pipe elements 35, right and left second upper pillar pipe elements 36, and right and left third upper pillar pipe elements 37. The right and left upper side pipe elements 34 extend in the forward and rearward direction and are disposed above the right and left lower side pipe elements 24, respectively. The upper side pipe elements 35 are coupled to each other by a plurality of cross members 38 to 40 extending in the rightward and leftward direction.

The first upper pillar pipe elements 35 extend downward from front end portions of the right and left upper side pipe elements 34, respectively. Lower end portions of the first upper pillar pipe elements 35 are coupled to the upper end portions of the first lower pillar pipe elements 25, by the coupling portions 31, respectively. The second upper pillar pipe elements 36 extend downward from center portions of the right and left upper side pipe elements 34, respectively. Lower end portions of the second upper pillar pipe elements 36 are coupled to upper end portions of the second lower pillar pipe elements 26 by coupling portions 32, respectively. The third upper pillar pipe elements 37 extend downward from front end portions of the right and left upper side pipe elements 34, respectively. Lower end portions of the third upper pillar pipe elements 37 are coupled to upper end portions of the third lower pillar pipe elements 27 by the coupling portions 33, respectively.

In a state where the main frame 21 and the cabin frame (ROPS) 22 are coupled to each other as described above, the left and right side members 11L and 11R are disposed outward in the vehicle width direction relative to the floor member 23. Each of the side members 11L and 11R includes the lower side pipe element 24, the first to third lower pillar pipe elements 25 to 27, the upper side portion 34, and the first to third upper pillar pipe elements 35 to 37. Hereinafter, the first lower pillar pipe element 25 and the first upper pillar pipe element 35 which are coupled to each other, are collectively referred to as "first pillar pipe element 41", the second lower pillar pipe element 26 and the second upper pillar pipe element 36 which are coupled to each other, are collectively referred to as "second pillar pipe element 42", and the third lower pillar pipe element 27 and the third upper pillar pipe element 37 which are coupled to each other, are collectively referred to as "third pillar pipe element 43".

Each first pillar pipe element 41 extends vertically and couples a front end portion of the lower side pipe element 24 to a front end portion of the upper side pipe element 34. Each second pillar pipe element 42 extends vertically and couples a center portion of the lower side pipe element 24 in the forward and rearward direction to a center portion of the upper side pipe element 34 in the forward and rearward direction. Each third pillar pipe element 43 extends vertically and connects a rear end portion of the lower side pipe element 24 to a rear end portion of the upper side pipe element 34. The four seats 5L, 5R, 6L and 6R (see FIG. 1) are arranged above the floor member 23, i.e., closer to a center in the vehicle width direction, relative to the left side member 11L and the right side member 11R. The seat backrest 9 of each of the front seats 5L and 5R (see FIG. 1) is disposed to overlap with the second pillar pipe element 42 when viewed from the side, while the seat backrest 9 of each of the rear seats 6L and 6R (see FIG. 1) is disposed to overlap with the third pillar pipe element 43 when viewed from the side (see FIG. 3).

Therefore, the front access openings 12L and 12R are defined by the first pillar pipe elements 41, the second pillar pipe elements 42, the lower side pipe elements 24 and the upper side pipe elements 34, outward in the width direction relative to the front seats 5L and 5R. The rear access openings 13L and 13R are defined by the second pillar pipe elements 42, the third pillar pipe elements 43, the lower side pipe elements 24 and the upper side pipe elements 34, outward in the width direction relative to the rear seats 6L and 6R. In the front access openings 12L and 12R, the first pillar pipe elements 41 serve as front pipes defining the front ends of the access openings 12L and 12R, respectively, while second pillar pipe elements 42 serve as rear pipes defining rear ends of the access openings 12L and 12R, respectively. In the rear access openings 13L and 13R, the second pillar pipe elements 42 serve as front pipes defining the front ends of the access openings 13L and 13R, respectively, while the third pillar pipe elements 43 serve as rear pipes defining rear ends of the access openings 13L and 13R, respectively.

Figure 4:
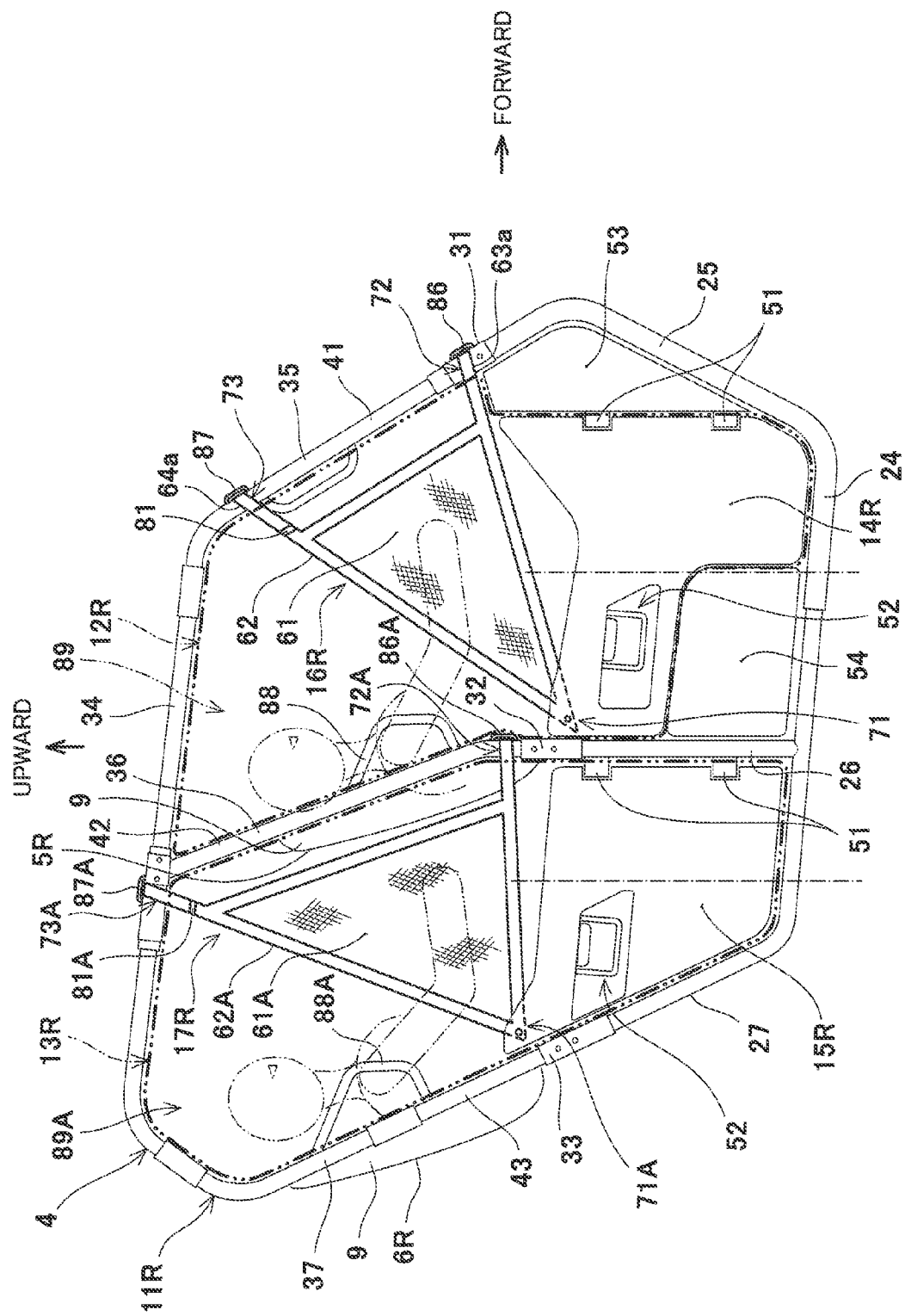
FIG. 4 is a side view showing a right side member when viewed from a right side.

FIG. 4 is a side view showing the right side member 11R when viewed from a right side. The left side member and the associated constituents are laterally symmetric with the right side member 11R and the associated constituents, and will not be described in detail. As shown in FIG. 4, the front door 14R is provided so as to close a lower portion of the front access opening 12R. The front door 14R is rotatably attached to the side member 11R via hinges 51. In this embodiment, the hinges 51 are interposed between a front end portion of the front door 14R and a front lower portion of the side member 11R. A latch 52 is attached to a rear end portion of the front door 14R to lock or unlock a state where the front door 14R closes the access opening 12R.

A front end portion of the front door 14R extends substantially vertically, while the first pillar pipe element 41 extends upward from a front end portion of the lower side pipe element 24 such that it is tilted in an obliquely forward direction, is then bent and extends upward such that it is tilted in an obliquely rearward direction to a front end portion of the upper side pipe element 34. For this reason, a decorative board 53 is provided to fill a region which is forward relative to the front end portion of the front door 14R and is behind the lower end portion of the first pillar pipe element 41. A similar decorative board 54 is provided at a corner portion defined by a lower end portion of the second pillar pipe element 41 and the lower side pipe element 24. The decorative boards 53 and 54 are not rotatable. Therefore, portions closed by the decorative boards 53 and 54, in a region surrounded by the first pillar pipe element 41, the second pillar pipe element 42, the lower side pipe element 24, and the upper side pipe element 34, do not serve as the opening through which the passenger accesses the seat 5R.

The front door 14R is disposed to close a region behind the decorative board 53 and regions forward of and above the decorative board 54. In a state where the front door 14R is closed, a rear end portion of the front door 14R is in close proximity to the second pillar pipe element 42. The front door 14R and the decorative board 53 are disposed such that their upper edges draw curves which are smoothly continuous when viewed from the side. A region under the upper edge of the front door 14R and a region under the upper edge of the decorative board 53, in the region defined by the first pillar pipe element 41, the second pillar pipe element 42, the lower side pipe element 24, and the upper side pipe element 34, is closed by the front door 14R and the decorative boards 53 and 54. The protective cover 16R partially closes a region (hereinafter simply referred to as above region) of the access opening 12R which is above the upper edge of the front door 14R and the upper edge of the decorative board 53. The protective cover 16R has a cover portion 61 for partially closing the above region. The cover portion 61 is formed by a fiber net. The cover portion 61 is easily treated, because it is lightweight, flexible and easily washable. If the cover portion 61 is damaged and partially broken, such breakage is less likely to progress. Even though the above region is partially closed by the protective cover 16R, outside scenery is easily visible through the cover portion 61 from inside the vehicle and a high venting property is ensured.

FIG. 5 is a side view showing the protective cover 16R when viewed from a left side. The protective cover 16R has a reinforcement band 62 provided along an edge of the cover portion 61. The reinforcement band 62 is formed of a synthetic fiber material and is sewed with the cover portion 61 in a state where an outer edge of the cover portion 61 is sandwiched between portions of the reinforcement band 62. This makes it possible to suitably inhibit the cover portion 61 formed by the fiber net from coming apart in an outer periphery thereof.

The reinforcement band 62 has a rim shape along the edge of the cover portion 61. In this embodiment, the cover portion 61 has a triangular shape. Therefore, the reinforcement band 62 has a first band 63, a second band 64 and a third band 65 respectively corresponding to three sides defining the outer edge of the cover portion 61. Thereby, the reinforcement band 62 forms a first corner portion 66 at which the first band 63 intersects the second band 64, a second corner portion 67 at which the first band 63 intersects the third band 65, and a third corner portion 68 at which the second band 64 intersects the third band 65. The first corner portion 66 is provided with a first mounting portion 71 by which the cover portion 61 is mounted to the door 14R, while the second corner portion 67 and the third corner portion 68 are provided with second mounting portions 72 and 73, respectively, by which the cover portion 61 is mounted to the vehicle body 4 (side member 11R). Hereinafter, in some cases, the mounting portion 72 provided at the second corner portion 67 is referred to as "lower mounting portion" by which the cover portion 61 is mounted to the side member 11R, while the mounting portion 73 provided at the third corner portion 68 is referred to as "upper mounting portion" by which the cover portion 61 is mounted to the side member 11R in a location above the lower mounting portion 72.

The first mounting portion 71 is formed by a through-hole 74 formed in the first corner portion 66. A metal-made cylindrical collar 75 is inserted into the through-hole 74 and is firmly fastened to the reinforcement band 62. The first band 63 has an extended portion 63a extending at an opposite side of the first corner portion 66 at which the first mounting portion 71 is provided, when viewed from the second corner portion 67. The lower mounting portion 72 has the extended portion 63a and a buckle mechanism 77 attached to the extended portion 63a. Likewise, the second band 64 has an extended portion 64a extending at an opposite side of the first corner portion 66 at which the first mounting portion 71 is provided, when viewed from the third corner portion 68. The upper mounting portion 73 has an extended portion 64a and a buckle mechanism 78 attached to the extended portion 64a. In this way, the lower mounting portion 72 and the upper mounting portion 73 protrude from the edge of the cover portion 61.

The protective cover 16R is configured such that a distance between a tip end of the upper mounting portion 73 and the first mounting portion 71 is variable. For this configuration, the upper mounting portion 73 has an extendable and contractible portion 81 to allow the distance to be variable.

With reference to FIGS. 5 to 7 together, the extendable and contractible portion 81 has a slack portion 82 which is formed by partially slacking the extended portion 64a of the second band 64 and an elastic body 83 joined to a surface of the extended portion 64a such that one end side and an opposite end side of the slack portion 82 are shortened. The elastic body 83 is formed of, for example, a rubber material and has a band shape. The elastic body 83 is joined only at both end portions thereof to the extended portion 64*a*. The slack portion 82 is provided between a joint portion joined to one end portion of the elastic body 83 and a joint portion joined to an opposite end portion of the elastic body 83. An intermediate portion of the elastic body 83 is not joined to the slack portion 82. In a state where no external force is applied to the elastic body 83, a length from one end of the elastic body 83 to an opposite end thereof is a predetermined initial length L1. This initial length L1 is shorter than a length of the slack portion 82. When a tension is applied to the second band 64 to extend the second band 64, the elastic body 83 is extended and a slack of the slack portion 82 is reduced.

When the elastic body 83 is extended to up to a length L2, the slack portion 83 is not slackened. The extendable and contractible portion 81 having such a configuration is extendable and contractible in a direction in which the second band 64 extends, by a distance corresponding to a difference between the initial length L1 of the elastic body 83 and the length L2 of the elastic body 83 in a state where the slack portion 83 is not slackened. By providing the extendable and contractible portion 81 having such a configuration, a distance L between a tip end of the upper mounting portion 73 and the first mounting portion 71 is variable within a range in which the extendable and contractible portion 81 is extendable and contractible.

Turning back to FIG. 4, the first mounting portion 71 of the protective cover 16R having the above configuration is fastened to a back surface (surface close to the seat 5R) of the door 14R by a bolt (not shown). The first mounting portion 71 is fastened to the front door 14R behind a location where the latch 52 is disposed, when viewed from a location of a center portion of the front door 14R in the forward and rearward direction.

Of the first pillar pipe element 41 and the second pillar pipe element 42, the first pillar pipe element 41 which is located forward, i.e., at a side where hinges 51 are disposed, is provided with a lower fastening member 86 and an upper fastening member 87. The lower fastening member 86 and the upper fastening member 87 are U-shaped. Each of the lower fastening member 86 and the upper fastening member 87 has a pair of tip end portions. The pair of tip end portions are welded to the first pillar pipe element 41 and thus the lower fastening member 86 and the upper fastening member 87 are fastened to the side member 11R. The lower fastening member 87 is welded to the coupling portion 31 provided at an upper end portion of the first lower pillar pipe element 25. The upper fastening member 87 is welded to an upper end portion of the first pillar pipe element 41.

The lower mounting portion 72 of the protective cover 16R is fastened to the first pillar pipe element 41 in such a manner that the extended portion 63*a* of the first band 63 (see FIG. 5) is wound around the coupling portion 31 and then tightened to the coupling portion 31 by the buckle mechanism 77 (see FIG. 5). In this case, the extended portion 63*a* is wound around the coupling portion 31 in such a way that it passes through a space between the lower fastening member 86 and the surface of the coupling portion 31. Likewise, the upper mounting portion 73 is fastened to the first pillar pipe element 41 in such a manner that the extended portion 64*a* of the second band 64 (see FIG. 5) is wound around the upper end portion of the first pillar pipe element 41 by passing it through a space between the upper fastening member 87 and the surface of the first pillar pipe element 41, and is tightened by the buckle mechanism 78 (see FIG. 5).

With the above configuration, in a state where the front door 16R is closed, the cover portion 61 of the protective cover 16R closes a front lower half portion in a triangular shape, in a region above the upper edge of the front door 16R. In this closed state, the extendable and contractible portion 81 is set so that the elastic body 83 (see FIG. 6) has the initial length L1. That is, in the closed state, the upper mounting portion 73 is fastened to the first pillar pipe element 41 to prevent an excess tension from being applied to the second band 64 (see FIG. 5).

In a state where the front door 14R and the protective cover 16R are closed, a portion in front of the second pillar pipe element 42, in the region above the upper edge of the front door 14R, is an open region 89 which is not closed by the protective cover 16R as well as the front door 14R. As described above, the seat backrest 9 of the front seat 5R is disposed to overlap with the second pillar pipe element 42 when viewed from the side. Therefore, in a state where the passenger is seated in the seat 5R properly, a head part and a shoulder part of the passenger are disposed in the portion in front of the second pillar pipe element 42, i.e., within the open region 89. Therefore, the passenger's visibility and a high ventilation property are ensured while protecting the passenger by closing the access opening 12R with the protective cover 16R. Since the cover portion 61 of the protective cover 16R is formed by the fiber net in this embodiment, the passenger can also see outside the vehicle through the cover portion 61. In this way, higher visibility is ensured.

A shoulder guard 88 protrudes forward from the second pillar pipe element 42. The shoulder guard 88 is disposed within the open region 89 when viewed from the side. Therefore, the shoulder part of the passenger can be protected from outside in the vehicle width direction while providing high visibility.

The protective cover 16 is mounted to the vehicle body frame 4 by the fastening members 86 and 87 provided at the first pillar pipe element 41. Therefore, when the protective cover 16R is detached for maintenance and is fastened to the vehicle body frame 4 and the front door 14R again, the passenger can mount the protective cover 16R properly in a desired location. In particular, even when a size of the protective cover 16R is increased to close a large region which is substantially as half as the above region of the front door 14R, the protective cover 16R can be mounted properly. In addition, the fastening members 86 and 87 can prevent the second mounting portions 72 and 73 from being displaced along the pipe.

With reference to FIG. 2, when the front door 14R is opened in a state where protective cover 16R is mounted in the above described manner, the door 14R rotates such that a rear side of the door protrudes outward in the vehicle width direction. According to this rotation, the protective cover 16R rotates around the second mounting portions 72 and 73 (see FIG. 4) in such a manner that the first mounting portion 71 (see FIG. 4) protrudes outward in the vehicle width direction along with the rear side of the front door 14R. Since the second mounting portions 72 and 73 are disposed in the vicinity of the hinges 51 (see FIG. 4), the protective cover 16R can be rotated smoothly along with the front door 14R. When the front door 14R is opened and as the first mounting portion 71 is moving outward in the vehicle width direction, a distance between the first mounting portion 71 and the second mounting portions 72 and 73, in particular, a distance between the upper mounting portion 73 and the first mounting portion 71 increases. In this embodiment, a distance between the upper mounting portion 73 and the first mounting portion 71 is variable. In addition, in the closed state, the elastic body 83 (FIG. 6) has the initial length L1, which is a minimum distance of a range of change in length. For this reason, an increase in the distance by opening of the front door 14R is addressed by extension of the extendable and contractible portion 81 (see FIG. 4). As a result, the front door 14R and the protective cover 16R can be opened smoothly without applying excessive tension to the protective cover 16R.

The above extendable and contractible portion 81 (see FIG. 4) is provided at the upper mounting portion 73 (see FIG. 4) protruding from the edge of the cover portion 61. Therefore, a distance between the first mounting portion 71 (see FIG. 4) and the upper mounting portion 73 is adjusted without a need to extend and contract the cover portion 61. Thereby, a material of the cover portion 61 may be selected with ease.

As shown in FIG. 4, the protective cover 17R is applied to the rear access opening 13R in the same manner. Although the protective cover 17R is different in shape from the protective cover 16R applied to the front access opening 12R according to a difference in shape of the access opening, the protective cover 17R has a configuration similar to that of the protective cover 16R except for such a design change in the shape. In other words, in FIG. 5, reference symbols 61A, 62A, 71A, 72A, 73A, 81A, 86A, 87A, 88A, and 89A given in association with the protective cover 17R designate constituents which are similar in structure and/or function to the cover portion 61, the reinforcement band 62, the first mounting portion 61, the lower mounting portion 72, the upper mounting portion 73, the extendable and contractible portion 81, the lower fastening member 86, the upper fastening member 87, the shoulder guard 88 and the open region 89, respectively. Because of this, the protective cover 17R is mounted to the door 15R and to the side member 11R in the same manner as described above. Therefore, similar advantages are achieved in the rear access opening 13R.

(Embodiment 2)

Figure 8:
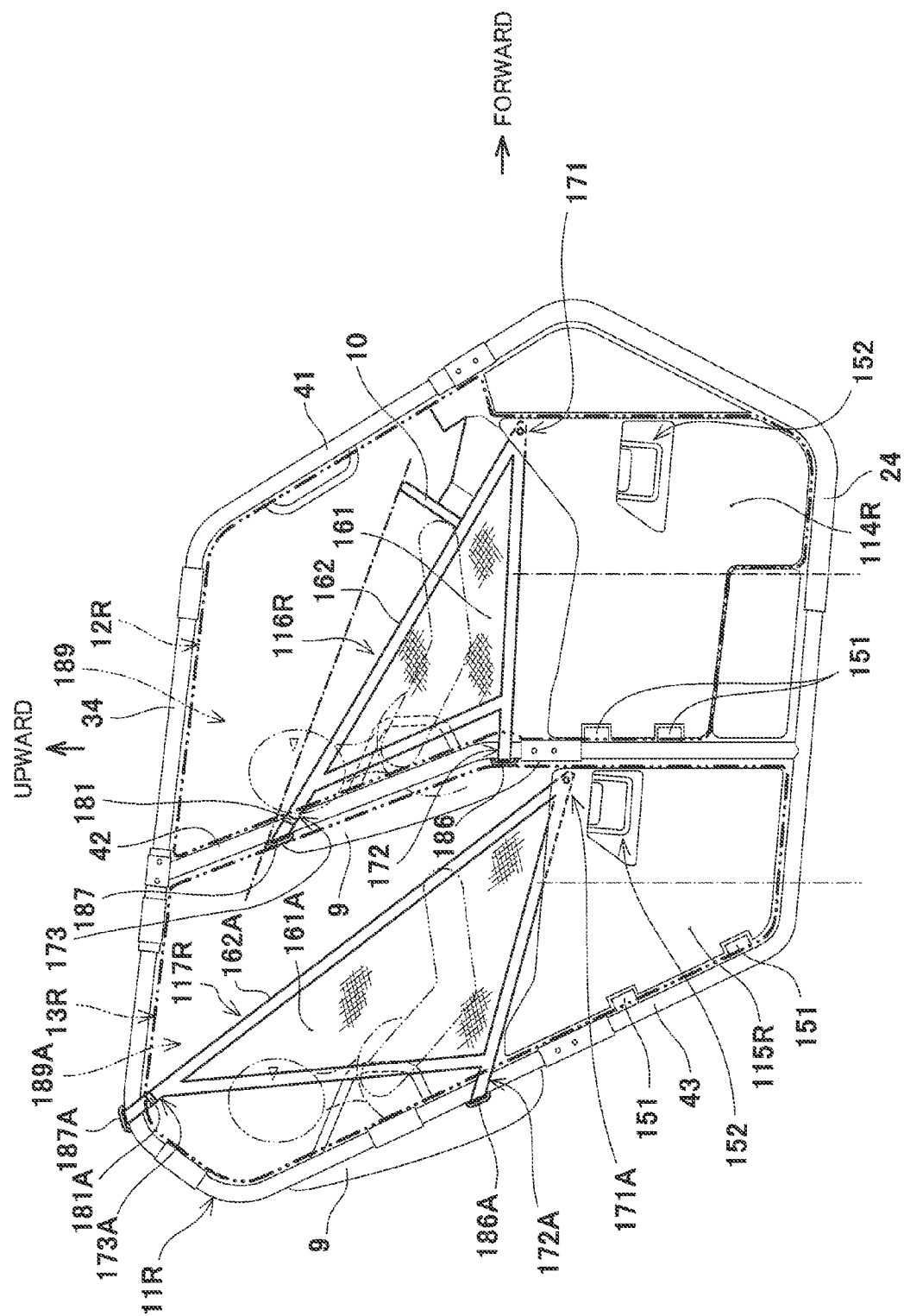
FIG. 8 is a side view showing a right side member according to Embodiment 2 of the present invention when viewed from a right side.

FIG. 8 is a side view showing the right side member 11R according to Embodiment 2 of the present invention when viewed from a right side. The right side member 11R shown in FIG. 8 has a structure identical to that shown in FIG. 4. In the embodiment, hinges 151 and a latch 152 of each of doors 114R and 115R are disposed at an opposite side of those of Embodiment 1. For this reason, locations of the protective covers 116R and 117R are different.

As shown in FIG. 8, the front door 114R is rotatably mounted at a rear portion thereof to a lower portion of the second pillar pipe element 42 via the hinges 151. The latch 152 is disposed at a front end portion of the front door 11R. The protective cover 116R has a triangular cover portion 161 for partially closing a region above an upper edge of the front door 114R, although its shape is slightly different from the shape in Embodiment 1. The protective cover 161 has a reinforcement band 162, a first mounting portion 171, a lower mounting portion 172, an upper mounting portion 173 and an extendable and contractible portion 181 which are similar to those of Embodiment 1.

The first mounting portion 171 is fastened to a back surface of the front door 114R by a bolt (not shown). The first mounting portion 171 is mounted to the front door 114R in a location closer to the latch 152 and away from a center portion of the front door 114R in the forward and rearward direction. The second pillar pipe element 42 is provided with a lower fastening member 186 and an upper fastening member 187 in locations above the hinges 151 and above an upper edge of the front door 112R. The lower mounting portion 172 is mounted to the second pillar pipe element 42 by the lower fastening member 186, while the upper mounting portion 173 is mounted to the second pillar pipe element 42 by the upper fastening member 187. The upper mounting portion 173 protrudes from an edge of the cover portion 161 and the extendable and contractible portion 181 is provided at the upper mounting portion 173.

When the front door 114R is closed, the protective cover 116R closes a rear lower half portion of the region above the upper edge of the front door 114R in a triangular shape. In particular, the protective cover 116R closes a portion in front of the second pillar pipe element 42, which is below a location where the upper fastening member 187 is provided. Therefore, a shoulder part and an arm part of the passenger can be protected favorably from outside in the vehicle width direction. A front upper portion of the above region is an open region 189 which is not closed by the front door 114R and the protective cover 116R. Since the open region 189 is formed in the front upper portion of the access opening 112R in this way, the passenger (in particular a driver) can ensure a forward view. An upper edge of the protective cover 116R is preferably located below a line connecting an upper end of the seat backrest 9 of the seat 5R to an upper end of the handle 10. Thus, a head part of the passenger can be located above the protective cover 116R, the passenger can ensure a wide forward view, and a ventilation property inside the vehicle can be made high. The protective cover 117R is applied to the rear access opening 13R like the front access opening 12R of this embodiment. The shape of the protective cover 117R is different from the protective cover 116R applied to the front access opening 12R according to a difference in shape of the access opening. Except for such a design change in shape, the protective cover 117R has a configuration similar to that of the protective cover 116R. In FIG. 8, reference symbols 161A, 162A, 171A, 172A, 173A, 181A, 186A, 187A, and 189A given in association with the protective cover 117R designate constituents which are similar in structure and/or function to the cover portion 161, the reinforcement band 162, the first mounting portion 171, the lower mounting portion 172, the upper mounting portion 173, the extendable and contractible portion 181, the lower fastening member 186, the upper fastening member 187, and the open region 189, respectively. Therefore, the protective cover 17R is mounted to the door 15R and to the side member 11R in the same manner. Therefore, similar advantages as those of the front access opening 12R are achieved in the rear access opening 13R.

(Modification Example)

Figure 9:
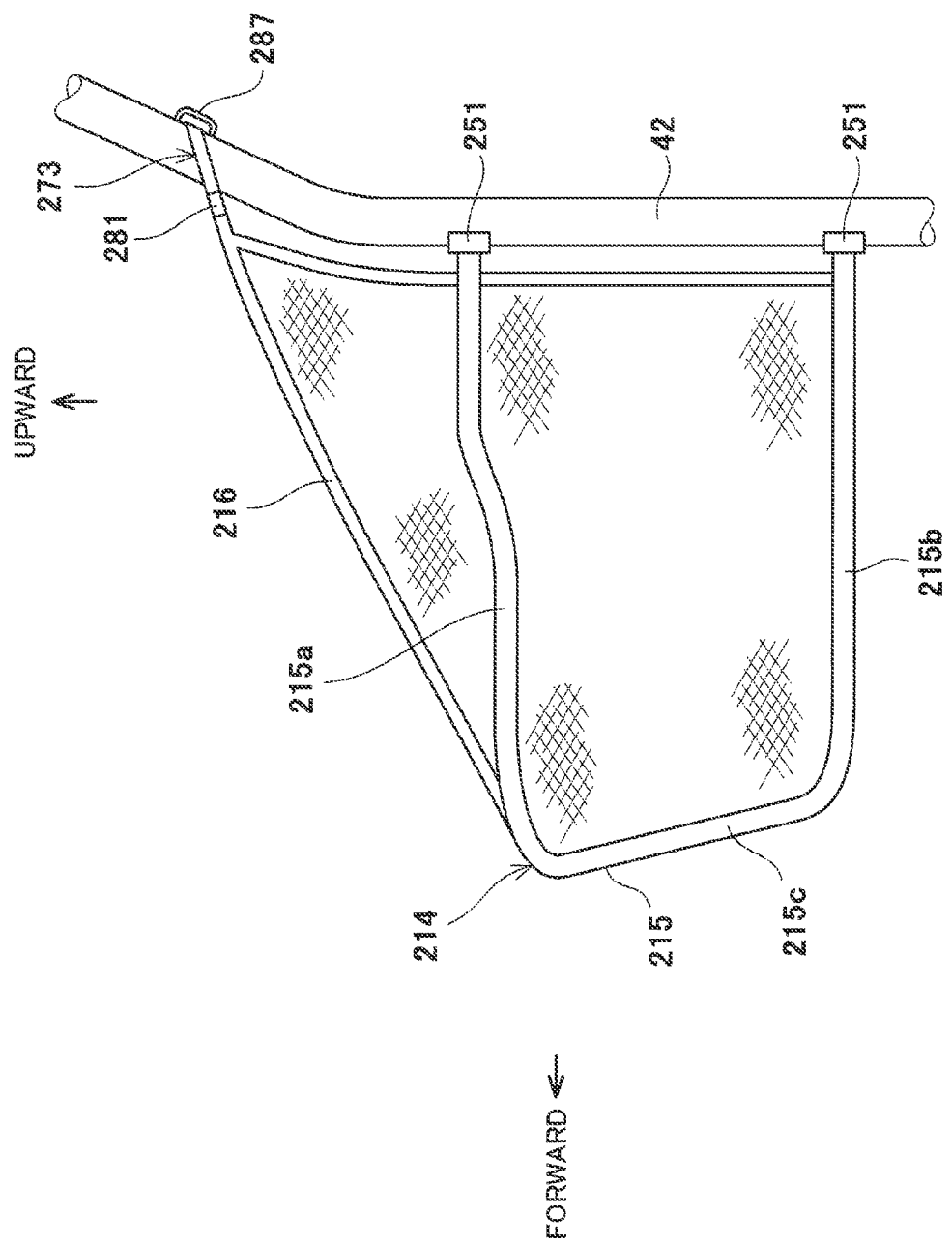
FIG. 9 is a side view showing a door and a protective cover of a utility vehicle according to a modification example of the embodiment of the present invention, when viewed from the left side.

FIG. 9 is a side view showing a door 214 according to a modification example of the embodiment of the present invention, when viewed from the left side. The door 214 shown in FIG. 9 is constructed of a substantially U-shaped metal-made pipe 215. The pipe 215 includes an upper pipe element 215a extending at left or right, a lower pipe element 215b extending at left or right, and a front pipe element 215c coupling a front end portion of the upper pipe element 215a to a front end portion of the lower pipe element 215b. A rear end portion of the upper pipe element 215a and a rear end portion of the lower pipe element 215b are rotatably mounted to the second pillar pipe element 42 via hinges 251. A protective cover 216 has a substantially trapezoid shape and is fastened to the pipe 215 to fill an inner region of the U-shaped pipe 215. A portion of the protective cover 216 protrudes in a triangular shape from an upper edge of the pipe 215. A mounting portion 273 is provided at a rear upper end portion of this protruding portion to mount the protective cover 216 to the vehicle body. The mounting portion 273 is mounted to the second pillar pipe element 42 by utilizing a fastening member 287 fastened to a portion of the second pillar pipe element 42 which is above the upper hinge 251. The mounting portion 273 is provided with an extendable and contractible portion 281 similar to the above. The extendable and contractible portion 281 is extended and contracted such that a distance between the mounting portion 273 and a portion of the protective cover 216 which is mounted to a front upper end of the door 214 is variable.

Since the protective cover 216 rotates along with the door 214 in the above configuration, the passenger does not have to perform a burdensome operation when getting into and getting out of the vehicle. Further, this modification is simpler in configuration than the above embodiment. Thus, for example, the door 214 and the protective cover 216 may easily be configured to be mounted as aftermarket parts to a style of a utility vehicle which is not originally provided with a door 214.

Figure 10:
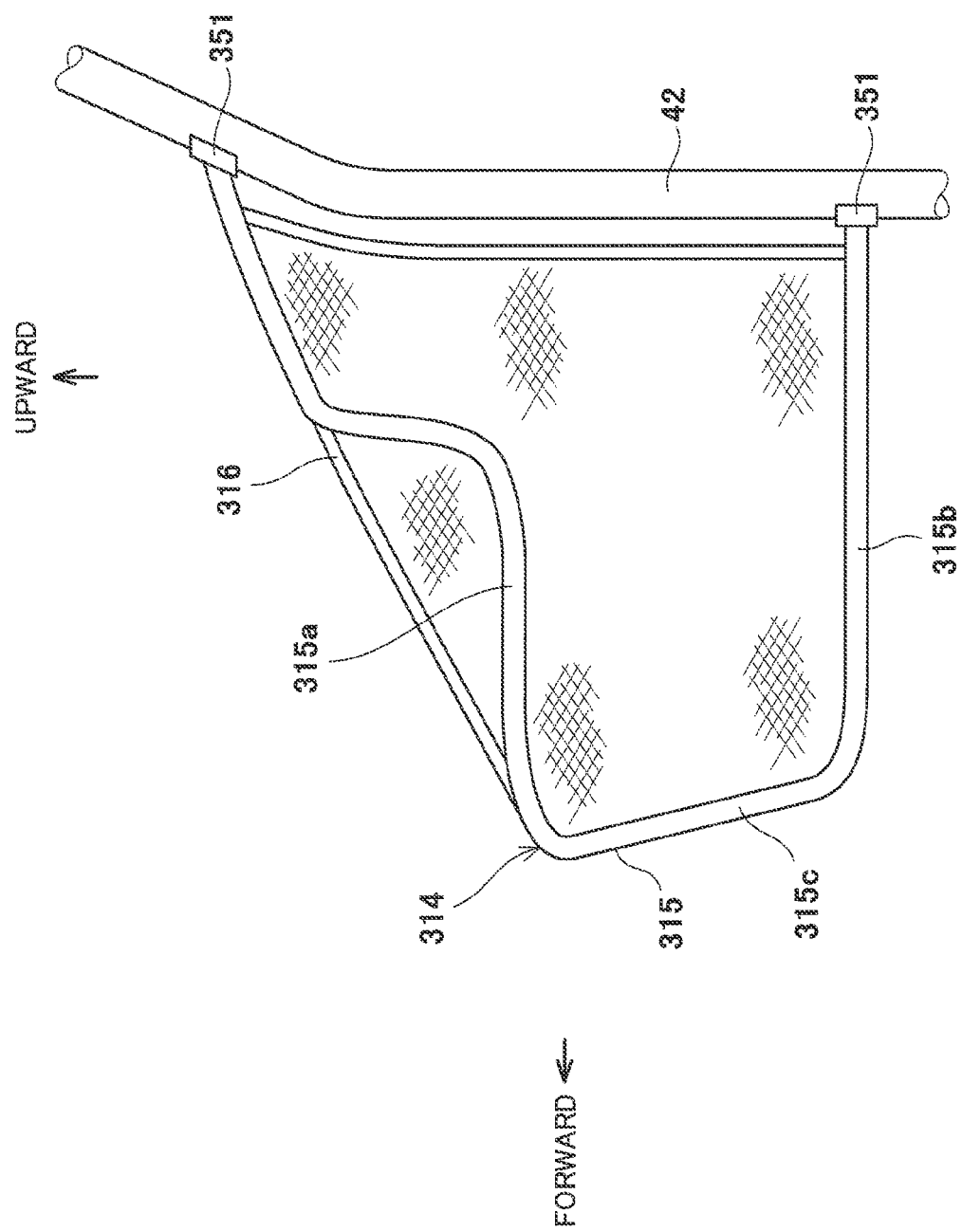
FIG. 10 is a side view showing a door and a protective cover of a utility vehicle according to another modification example of the embodiment of the present invention, when viewed from the left side.

FIG. 10 is a side view showing a door 314 according to a modification example 2 of the embodiment of the present invention, when viewed from the left side. The door 314 shown in FIG. 10 is constructed of a metal-made pipe 315. An upper pipe element 315a of the pipe 315 is bent in a crank shape such that its rear portion is away from the lower pipe element 315b. A rear end portion of the upper pipe element 315a is mounted to the second pillar pipe element 42 via a hinge 351 such that the upper pipe element 315a is rotatable. The protective cover 316 has a substantially trapezoid shape and is fastened only to the door 314 to fill an inner region of the pipe 315. The rear portion of the upper pipe element 315a is bent in a crank shape, but the upper edge of the protective cover 316 extends substantially in a straight-line shape. Therefore, a portion above the upper edge of the front portion of the upper pipe element 315a is closed by the protective cover 316. Since the protective cover 316 rotates along with the door 314 in the above configuration, the passenger does not have to perform a burdensome operation when getting into and getting out of the vehicle. In this modification example, the above requirement is easily met.

Alternatively, a distance between the lower mounting portion and the first mounting portion may be variable. In this case, the extendable and contractible portion may be provided at least one of the lower mounting portion and the first mounting portion. Although the upper mounting portion is provided with the extendable and contractible portion such that a distance between the upper mounting portion and the first mounting portion in the vehicle body is variable, such an extendable and contractible portion may be provided at the first mounting portion instead of the upper mounting portion, or the extendable and contractible portion provided at the first mounting portion may be used in addition to that provided at the upper mounting portion. The protective cover is not limited to the fiber net. A resin sheet having light transmissibility may be used to ensure the passenger's visibility and protect the passenger, or a non-transparent sheet or cloth may be used to protect the passenger.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a seat mounted to a vehicle body frame to seat a passenger thereon;
a side member positioned outward in a vehicle width direction relative to the seat and forming a part of the vehicle body frame;
an access opening defined by the side member, the seat being accessible by the passenger through the access opening;
a door rotatably mounted to the side member to open and close a part of the access opening; and
a protective cover provided between the door and the side member and coupled to the door and to the side member, the protective cover being rotatable with respect to the side member along with the door and closing at least a part of a portion of the access opening, which portion is above the door, in a state where the door is closed.

2. The utility vehicle according to claim 1,
wherein the protective cover includes a first mounting portion for mounting the protective cover to the door, and a second mounting portion for mounting the protective cover to the side member; and
wherein a distance between the first mounting portion and the second mounting portion is variable.

3. The utility vehicle according to claim 2,
wherein the protective cover has a cover portion for closing the access opening;
wherein the first mounting portion and the second mounting portion protrude from an edge of the cover portion; and
wherein at least one of the first mounting portion and the second mounting portion is extendable and contractible such that the distance between the first mounting portion and the second mounting portion is variable.

4. The utility vehicle according to claim 1,
wherein a hinge is provided at one end portion of the door in a forward and rearward direction, and a latch is provided at an opposite end portion of the door in the forward and rearward direction;
wherein the protective cover includes a first mounting portion for mounting the protective cover to the door, and a second mounting portion for mounting the protective cover to the side member;
wherein the first mounting portion is mounted to the door in a location closer to a location where the latch is disposed and away from a center portion of the door in the forward and rearward direction when viewed from a side; and
wherein the second mounting portion is mounted to the side member in a location closer to a location where the hinge is disposed and away from the center portion of the door when viewed from a side.

5. The utility vehicle according to claim 4,
wherein the side member includes a front pipe extending substantially vertically and a rear pipe extending substantially vertically, and a fastening member for fastening the first mounting portion is provided at the front pipe or the rear pipe at which the hinge is provided such that the fastening member is positioned above the hinge.

6. The utility vehicle according to claim 4,
wherein the side member includes a front pipe extending substantially vertically and a rear pipe extending substantially vertically;
wherein the second mounting portion includes a lower mounting portion for mounting the protective cover to the side member and an upper mounting portion located above a location where the lower mounting portion is mounted, to mount the protective cover to the side member; and
wherein the lower mounting portion and the upper mounting portion are mounted to the front pipe or the rear pipe at which the hinge is disposed such that the fastening member is positioned above the hinge.

7. The utility vehicle according to claim 6,
wherein the hinge is provided at a front portion of the door and the latch is provided at a rear portion of the door; and
wherein the protective cover is disposed to close a portion of the access opening which portion is above the door, in a substantially triangular shape.

8. The utility vehicle according to claim 7, further comprising:
a shoulder guard protruding forward from the rear pipe;
wherein the shoulder guard is disposed in a region which is not closed by the door and the protective cover when viewed from a side.

9. The utility vehicle according to claim 6,
wherein the hinge is provided at a rear portion of the door and the latch is provided at a front portion of the door; and
wherein the protective cover is disposed to close a portion of the access opening which portion is above the door in a substantially triangular shape.

10. The utility vehicle according to claim 9,
wherein an upper edge of the protective cover is located below a line connecting an upper end portion of a backrest of the seat and an upper end portion of a handle.

11. The utility vehicle according to claim 6,
wherein a distance between the first mounting portion and the upper mounting portion is variable.

12. The utility vehicle according to claim 1,
wherein the protective cover has a cover portion for closing the access opening, and the cover portion is formed of a fiber net.

* * * * *